US012600488B2

(12) United States Patent
Ayat et al.

(10) Patent No.: US 12,600,488 B2
(45) Date of Patent: Apr. 14, 2026

(54) FLUX BARRIER ELECTRIC MACHINE WITH SUPERCONDUCTING INDUCED ELEMENT AND INDUCTOR

(71) Applicants: SAFRAN, Paris (FR); UNIVERSITE DE LORRAINE, Nancy (FR)

(72) Inventors: Sabrina Siham Ayat, Moissy-Cramayel (FR); Alexandre Colle, Montreuil (FR); Rémy Biaujaud, Moissy-Cramayel (FR)

(73) Assignees: SAFRAN, Paris (FR); UNIVERSITE DE LORRAINE, Nancy (FR)

( * ) Notice: Subject to any disclaimer, the term of this patent is extended or adjusted under 35 U.S.C. 154(b) by 0 days.

(21) Appl. No.: 17/782,518

(22) PCT Filed: Dec. 1, 2020

(86) PCT No.: PCT/EP2020/084003
§ 371 (c)(1),
(2) Date: Jun. 3, 2022

(87) PCT Pub. No.: WO2021/110618
PCT Pub. Date: Jun. 10, 2021

(65) Prior Publication Data
US 2023/0006534 A1     Jan. 5, 2023

(30) Foreign Application Priority Data
Dec. 4, 2019     (FR) ....................................... 1913738

(51) Int. Cl.
*H02K 9/00* (2006.01)
*B64D 33/08* (2006.01)
(Continued)

(52) U.S. Cl.
CPC ............... *B64D 33/08* (2013.01); *H01F 6/06* (2013.01); *H02K 9/00* (2013.01); *H02K 55/00* (2013.01); *B64D 27/34* (2024.01)

(58) Field of Classification Search
CPC ... H02K 7/00; H02K 7/09; H02K 9/00; F02K 55/00; F16C 32/04; F16C 32/0438;
(Continued)

(56) References Cited

U.S. PATENT DOCUMENTS 3,564,307 A     2/1971 Ushio et al.
3,673,444 A  *  6/1972 Kawabe ................. H02K 55/00
                                                     310/10
(Continued)

FOREIGN PATENT DOCUMENTS

CN     105063394 A  * 11/2015
CN     108869543 A  * 11/2018
(Continued)

OTHER PUBLICATIONS

International Search Report, mailed Dec. 18, 2020 in corresponding International Patent Application No. PCT/EP2020/084003, 19 pages. Written Opinion, mailed Dec. 18, 2020 in corresponding International Patent Application No. PCT/EP2020/084003, 17 pages.

*Primary Examiner* — Tran N Nguyen
(74) *Attorney, Agent, or Firm* — CHRISTENSEN O'CONNOR JOHNSON KINDNESS PLLC

(57) ABSTRACT

A superconducting flux barrier electric machine, including one induced element and one inductor, the inductor including one superconducting induction coil and a rotary portion forming a rotor, and the induced element including one arrangement of electromagnetic coils coaxial with the superconducting induction coil, the rotor comprising superconducting pellets mounted radially inside the superconducting coil on an axis of rotation of the machine, where the electromagnetic coils are made of superconducting material
(Continued)

and the induced element and the inductor are arranged in an assembly forming a cooling chamber provided with specific cooling means for the superconducting elements of the induced element and the inductor.

4 Claims, 6 Drawing Sheets

(51) Int. Cl.
  *H01F 6/06* (2006.01)
  *H02K 55/00* (2006.01)
  *B64D 27/34* (2024.01)

(58) Field of Classification Search
  CPC ........ B64D 33/00; B64D 33/08; B64D 27/00; B64D 27/02; B64D 27/64; H01F 6/00; H01F 6/06
  See application file for complete search history.

(56) References Cited

U.S. PATENT DOCUMENTS

| | | | |
|---|---|---|---|
| 2007/0052304 A1 | 3/2007 | Masson et al. | |
| 2008/0061637 A1* | 3/2008 | Gamble | H02K 3/47 |
| | | | 310/214 |
| 2010/0179063 A1* | 7/2010 | Martchevskii | H10N 60/0268 |
| | | | 505/433 |
| 2012/0019090 A1 | 1/2012 | Hasegawa et al. | |
| 2016/0276896 A1* | 9/2016 | Morrison | H02K 7/1838 |
| 2019/0009917 A1 | 1/2019 | Anton et al. | |

FOREIGN PATENT DOCUMENTS

| | | | |
|---|---|---|---|
| EP | 2221895 A2 * | 8/2010 | |
| FR | 2422280 A1 | 11/1979 | |
| WO | WO2016029918 A1 * | 3/2016 | |

* cited by examiner

[Fig 1]
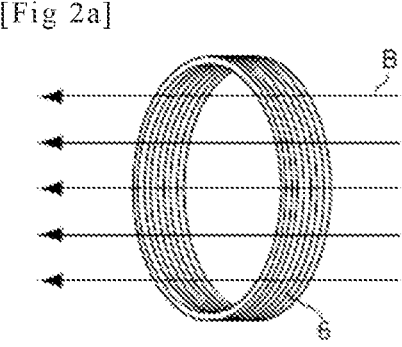
[Fig 2a]

[Fig 4]
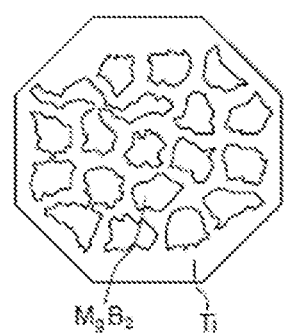
[Fig 5]
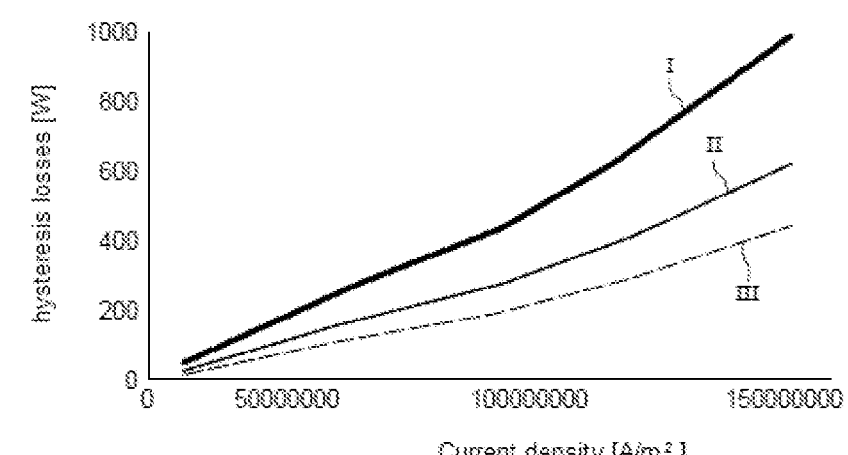

[Fig 6]
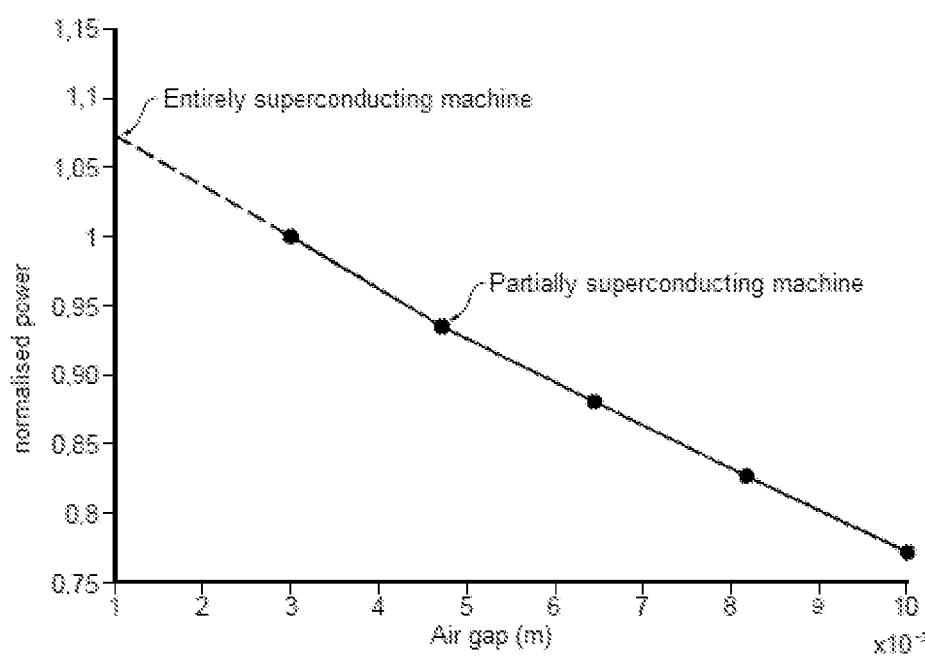
[Fig 7]
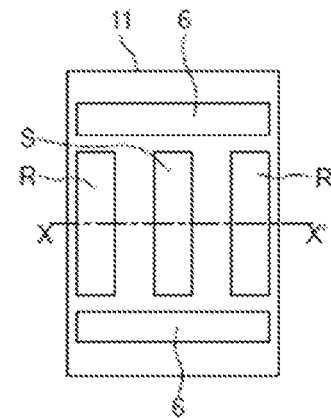

[Fig 7a]
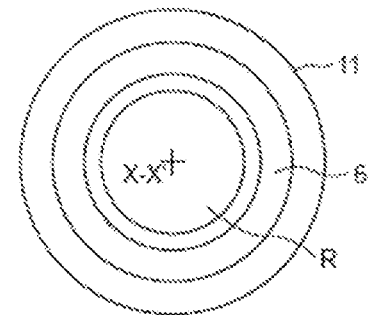
[Fig 8]
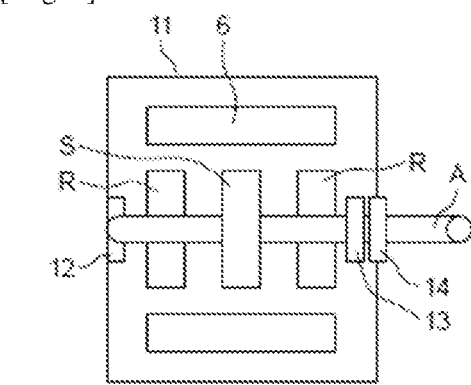
[Fig 9]
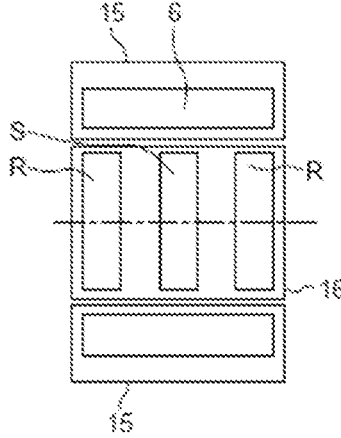

[Fig 10]
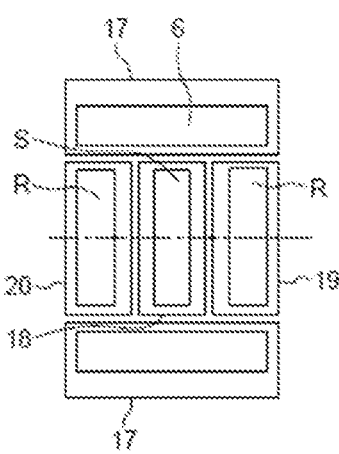

FLUX BARRIER ELECTRIC MACHINE WITH SUPERCONDUCTING INDUCED ELEMENT AND INDUCTOR

CROSS-REFERENCES TO RELATED APPLICATIONS

This application is a National Stage of International Application No. PCT/EP2020/084003 filed Dec. 1, 2020, which claims priority to French Patent Application No. 1913738, filed Dec. 4, 2019, the entire disclosures of which are hereby incorporated by reference.

TECHNICAL FIELD OF THE INVENTION

The present invention relates to superconducting flux barrier electric machines and, more particularly, superconducting axial or radial-flux electric machines using superconducting pellets to modulate the magnetic field created by the inductor of the electric machine.

A particularly interesting application of the invention relates to turbomachines intended for supplying to aircraft on-board networks with electrical energy.

PRIOR ART

Propulsion systems for electric or hybrid aircrafts require the use of electric motors capable of competing with, and even exceeding, the performances of heat engines.

Electric machines intended for the propulsion of electric aircraft need to be capable of outputting electric power densities higher than about 20 kW per kg.

In this context, the use of superconducting machines is advantageous to be able to reach these power density levels.

Indeed, when cooled down to a temperature lower than their critical temperature, superconducting materials have zero resistivity, which allows direct currents to flow without losses. At this temperature, they also feature a diamagnetic response to any variation in the magnetic field.

The absence of resistivity of superconducting materials at a temperature lower than their critical temperature allows increasing the current density flowing in the conductors.

Indeed, the absence of Joule losses in superconducting conductors allows avoiding a linear increase in cooling needs with the increase of the power of superconducting electric motors. Nevertheless, it is still necessary to cool them down to temperatures lower than their critical temperature, typically below 100 K.

In general, electric machines comprise one or several induced element(s) and one or several inductor(s). In general, the induced element includes an arrangement of electromagnetic coils and a yoke provided with an iron crown. In the case of an axial-flux machine, the inductor may include a superconducting coil coaxial with the arrangement of the electromagnetic coils of the induced element and pellets arranged radially inside the superconducting coil.

The absence of Joule losses, due to the zero resistivity of superconducting materials at temperatures lower than their critical temperature, is true only for the direct component of the excitation current.

In alternating current, the losses in the superconducting conductors are no longer negligible and, if the rotational speed of the machine is too high, the losses could be very high and the efficiency of the machine might be considerably reduced.

The superconducting flux barrier generators according to the prior art include, in particular for applications at high rotational speed, typically higher than 1,000 revolutions per minute, a partially superconducting structure, with one or several induced element(s) formed of electromagnetic coils made based on conductors made of non-superconductive materials, such as copper or aluminium.

Although such a structure allows placing the induced element outside the cryogenic chamber of the machine, and therefore limiting the energy used for cooling, such a structure, which comprises an alternation of superconducting regions and non-superconducting regions complicates the implementation of the machine.

In any event, such a structure features a limitation of the current density flowing in the conductors and, consequently, the power density of the machine.

In view of the foregoing, an objective of the present invention is to provide a superconducting flux barrier electric machine capable of improving the supplied electrical power density and that being so, within a reduced size and with a simple construction.

DISCLOSURE OF THE INVENTION

Hence, an object of the invention is a superconducting flux barrier electric machine, comprising an induced element and an inductor, one of the induced element or the inductor housing a rotor and a superconducting induction coil, and the other comprising an arrangement of electromagnetic coils coaxial with the superconducting induction coil, the rotor comprising superconducting pellets mounted radially inside the superconducting coil on an axis of rotation of the machine.

The electromagnetic coils are made of a superconducting material, the induced element and the inductor being arranged in an assembly forming a cooling chamber provided with cooling means specific to the superconducting elements of the induced element and the inductor.

Thus, the induced element and the inductor are made of a superconducting material, allowing for an increase in the power of the machine.

Furthermore, it is no longer necessary to provide the machine with a yoke made of a ferromagnetic material conventionally used to guide the flux to loop back the magnetic field lines, thereby allowing for a reduction in the mass of the machine.

Nonetheless, in one embodiment, the machine may include a stator yoke provided with at least one iron crown.

For example, the electromagnetic coils of the induced element include twisted filaments comprising MgB2 in a titanium matrix.

In one embodiment, the induced element and the inductor are arranged in a common cryogenic cooling chamber.

Thus, cooling of the induced element and the inductor could be shared, a single cryogenic cooling system could be used, thus allowing simplifying making of the machine.

Alternatively, the assembly forming a cooling chamber comprises a first cryogenic chamber in which the superconducting induction coil is placed and a second cryogenic chamber in which said at least one inductor and said at least one induced element are placed.

According to still another embodiment, the assembly forming a cooling chamber includes a first cryogenic chamber in which the superconducting coil is placed and cryogenic chambers in which the rotor of said at least one inductor and said at least one induced element are respectively placed.

In the various considered embodiments, said assembly forming a cooling chamber may comprise at least one vacuum chamber. Preferably, at least one such vacuum chamber is provided for in which the rotor of said at least one inductor is placed, so that losses by friction are reduced.

The machine may further include conduction cooling means.

The machine may also be provided with an assembly of chambers filled with a cryogen.

According to another aspect, an object of the invention is also an aircraft comprising at least one turbomachine comprising an electric machine as defined hereinabove.

BRIEF DESCRIPTION OF THE DRAWINGS

Other aims, features and advantages of the invention will appear upon reading the following description, provided only as a non-limiting example and made with reference to the appended drawings wherein:

FIG. 1 schematically illustrates the general architecture of a superconducting flux barrier electric machine according to the invention;

FIGS. 2a-2b illustrate the operation of the machine of FIG. 1;

FIG. 3 shows the variation of the magnetic field generated by the rotation of the superconducting pellets of the inductor;

FIG. 4 shows an embodiment of the superconducting wire of the electromagnetic coils of the induced element;

FIG. 5 shows the evolution of hysteresis losses in the superconducting filament of the arrangement of electromagnetic coils of the induced element as a function of the current density in the wire, for various numbers of filaments;

FIG. 6 is a curve showing the evolution of the normalised power as a function of the air gap of the machine;

FIGS. 7 and 7a schematically illustrate a first embodiment of a superconducting electric machine according to the invention;

FIG. 8 schematically illustrates a mode of implementation of the machine of FIGS. 7 and 7a;

FIG. 9 illustrates a second embodiment of a superconducting electric machine in accordance with the invention and FIG. 10 illustrates a second embodiment of a superconducting electric machine in accordance with the invention.

DETAILED DISCLOSURE OF AT LEAST ONE EMBODIMENT

A superconducting flux barrier electric machine according to one embodiment is schematically represented in FIG. 1, referred to by the general reference numeral 1.

The electric machine 1 comprises an induced element 2 and an inductor 3. In various embodiments and implementations, the machine 1 may be an axial-flux or radial-flux barrier electric machine and could operate in motor mode, in which it is supplied with electricity to provide a motive rotary force, or in generator mode, in which it is driven in rotation to supply electrical energy. In the embodiment described in the following the description, the electric machine 1 is an axial-flux electric machine, and operates in generator mode. The induced element 2 is formed by the stator of the electric machine and the rotary portion of the inductor 3 forms the rotor of the electric machine.

It should be noted that the machine 1 may include several stators, for example two in number, only one of the stators being illustrated in FIG. 1.

The induced element 2 includes an annular arrangement 4 of several fixed electromagnetic coils 5 defining an axial direction DA, a circumferential direction Dc and a radial direction DR.

The inductor 3 includes a fixed superconducting coil 6 coaxial with the arrangement of the electromagnetic coils 5 of the induced element and rotor superconducting pellets 7 arranged in the same plane orthogonal to the axial direction DA and radially inside the superconducting coil 6, and is closed by an optional stator yoke including an iron crown 8.

Each of the superconducting pellets 7 is mounted on a support 9 linked to a rotary shaft 10 of the machine, extending according to an axis X-X' parallel to the axial direction DA. In the illustrated example, the superconducting pellets 7 have a circular disk shape, but they could have other shapes such as a ring sector shape and the invention covers all of these embodiments of the pellets.

The superconducting pellets are configured to form flux barriers or permanent magnets made of a superconducting material. Advantageously, they are distributed in the ortho-radial direction of the superconducting machine, which allows a spatial variation of the electromagnetic field in the air gap. Advantageously, these pellets may be spaced apart so that the opening angle of the pellets represents between 60 and 70% of the total opening angle of a pair of poles, allowing for an optimisation of the flux modulation. Each pair of poles consists of a superconducting pellet 7 and the space between this superconducting pellet and the next one.

The superconducting coil 6 of the inductor 3 is a static superconducting coil powered with direct current and the stator yoke ensures mechanical strength of the coils.

Nonetheless, this yoke may be omitted in order to reduce the mass of the machine.

Figures 2B, 3:
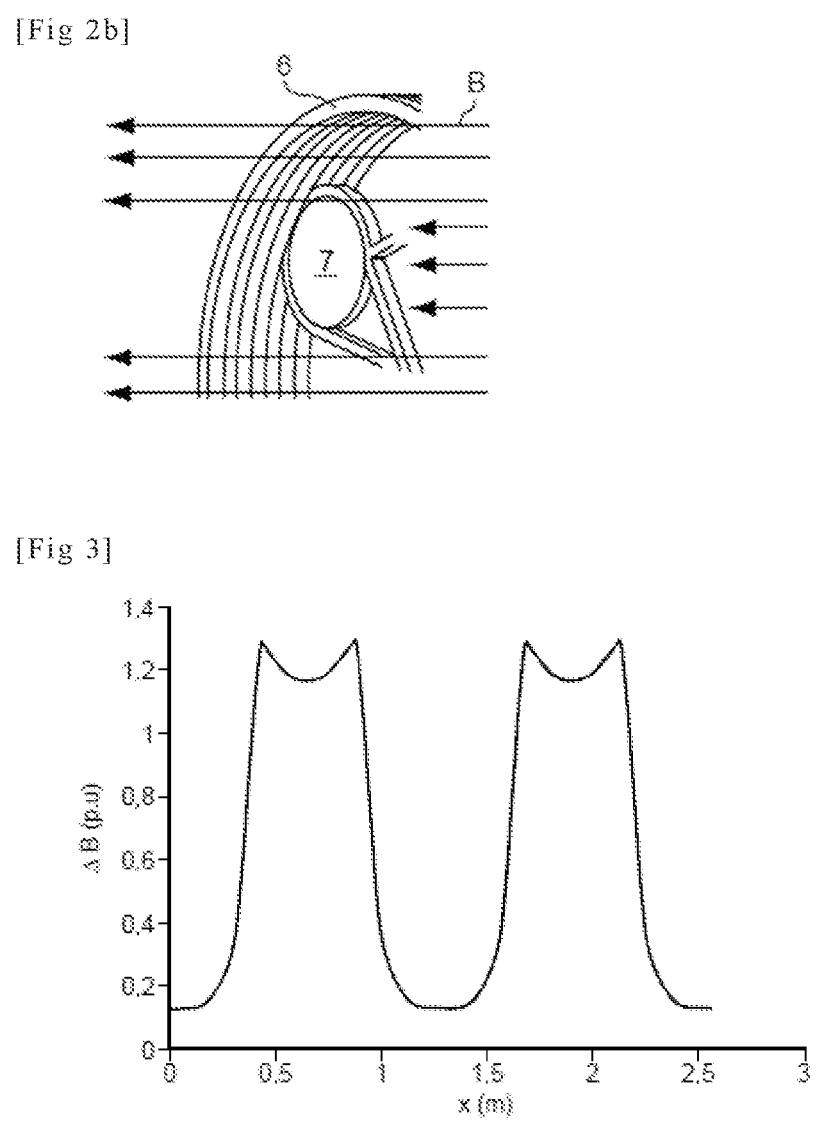

Referring to FIGS. 2a and 2b, such a superconducting flux barrier electric machine operates as follows.

Firstly, powering the superconducting coil 6 with direct current causes the apparition of an intense magnetic field B. The rotary superconducting pellets 7 cause a variation of the magnetic field, the magnetic field being stopped by the pellets due to their diamagnetic response (FIG. 2b).

The electromagnetic coils of the coil arrangement are exposed to this variable magnetic field B created by the rotation of the rotor. An electromotive force is then generated.

The variation of the axial component of the magnetic induction in the machine as a function of the angular position of the rotor is shown in FIG. 3.

The coils of the coil arrangement of the induced element are made of a superconducting material. Thus, the inductor and the induced element of the machine are both made of a superconducting material.

Referring to FIG. 4, for example, the coils of the coil arrangement of the induced element are made from a multifilament conductor comprising for example several filaments within an adequate resistive matrix to reduce eddy currents. For example, the number of filaments may vary between 20 and 100, the resistive matrix being for example made of titanium. Advantageously, the filaments are made of twisted MgB2.

It has been noticed that such a multifilament conductor allows reducing losses in alternating current applications (FIG. 5).

Indeed, it has been noticed that the use of such a multifilament conductor allows obtaining hysteresis losses of 55, 35 and 25 watts for wires including strands of 20 filaments (curve I), 50 filaments (curve II) and 100 filaments (curve III), respectively.

Moreover, the machine according to the invention, comprising superconducting inductor and induced element, allows for a reduction of the air gap.

As indicated before, thanks to making of the inductor and the induced element in a superconducting material, the inductor and the induced element can be placed in a common cryogenic chamber equipped with cooling means specific to each of the superconducting elements.

Placing the inductor and the induced element in the same chamber allows reducing the thickness of the air gap to a thickness corresponding to conventional machines. As shown in FIG. 6, which illustrates the evolution of the power of a superconducting machine as a function of the thickness of the air gap, the reduction of the air gap allows for an increase in the power of the machine in the range of 15%. By increasing the current density, the increase in the power of the machine could then exceed 100%.

An embodiment of a superconducting electric machine is represented in FIGS. 7 and 7a comprising a common cryogenic cooling chamber 11, respectively in profile and front views.

In this embodiment, the electric machine 1 includes a single stator S and two rotors R placed on either side of the stator. Of course, an arrangement with two stators and one stator could also be considered.

This chamber is provided with cooling means specific to each superconducting element of the electric machine, which are intended to maintain the temperature of each of these elements below their critical temperature. In particular, these cooling means are intended to simultaneously cool down the superconducting elements of the machine so as to cool them down to a temperature below the lowest critical temperature of these elements.

In one embodiment, cooling is obtained by setting the cryogenic chamber 11 under vacuum in order to prevent any heat transfer by convection between the rotor, the induced element and the induction coil 6. Furthermore, in order to limit the exchanges by radiation between these elements, means for limiting these exchanges may be provided for, for example by making these elements black.

Furthermore, means for cooling each element by conduction may be provided for, for example by setting it into contact with a cold solid element.

Alternatively, a cryogenic fluid may be injected into the cryogenic chamber 11 to directly cool down the various elements placed in the chamber by convection.

For example, a helium-based cryogen could be used.

Referring to FIG. 8, in which one could see that the shaft A supporting the rotors R is supported by two bearings 12 and 13, a seal 14 is provided for in order to avoid cryogen leaks.

In the embodiment that has just been described wherein the superconducting elements of the machine are placed in a common cryogenic chamber, the common cooling means ensure cooling of all of these elements to a same temperature lower than the lowest critical temperature.

In a second embodiment shown in FIG. 9, the machine includes two cryogenic cooling chambers 15 and 16 inside which the superconducting induction coil 6, on the one hand, and the rotors and the stator, on the other hand, are respectively placed.

Like in the previously-described embodiment, each chamber is associated with cooling means specific to the superconducting elements contained therein in order to cool down these elements specifically to a temperature lower than their critical temperature.

These cooling means may consist either in setting the chamber under vacuum, combined where necessary with means for reducing the emissivity of the materials and with means for cooling by conduction, or consist in injecting a cryogen into each chamber in order to cool down the elements directly. Advantageously, it is possible to provide for at least the rotor(s) being placed in a cooling chamber set under vacuum, allowing reducing losses by friction.

Of course, sealing means may also be provided for to limit cryogen leaks.

Finally, referring to FIG. 10, the set of chambers may include several chambers 17, 18, 19 and 20 in which the superconducting induction coil 6, the rotors R and the stator S are respectively placed.

As indicated before, each chamber is provided with means for cooling by vacuum combined, where necessary, with means for reducing the emissivity of the materials and means for cooling by conduction or by injection of a cryogen for cooling the superconducting elements by convection. Like before, sealing means may be provided for each cryogenic chamber.

Finally, it should be noted that the embodiments of FIGS. 7 to 10 also apply to arrangements in which the inductor and the induced element comprise any number of rotors and stators.

The invention claimed is:

1. A superconducting flux barrier electric machine, comprising:
   an induced element, and
   an inductor, wherein the inductor comprises a superconducting induction coil and a rotary portion forming a rotor, and the induced element comprises an arrangement of electromagnetic coils coaxial with the superconducting induction coil,
   wherein the rotor comprises superconducting pellets mounted radially inside the superconducting coil on an axis of rotation of the machine, the superconducting pellets being distributed in the orthoradial direction of the superconducting machine and configured to form flux barriers, wherein the electromagnetic coils are made of a superconducting material and wherein the induced element and the inductor are arranged in an assembly forming a cooling chamber provided with at least one vacuum chamber configured to cool down the superconducting induction coil, electromagnetic coils, and superconducting pellets, wherein the electromagnetic coils comprise twisted filaments comprising $MgB_2$ in a titanium matrix, wherein the assembly forming the cooling chamber comprises a first cryogenic chamber in which the superconducting induction coil is placed and a second cryogenic chamber in which the rotary portion of the inductor and the induced element are placed.

2. The machine according to claim 1, further comprising a stator yoke closing the inductor and including at least one iron crown.

3. An aircraft comprising at least one turbomachine comprising the electric machine according to claim 1.

4. A superconducting flux barrier electric machine, comprising:
   an induced element, and
   an inductor, wherein the inductor comprises a superconducting induction coil and a rotary portion forming a rotor, and the induced element comprises an arrangement of electromagnetic coils coaxial with the superconducting induction coil, wherein the rotor comprises superconducting pellets mounted radially inside the superconducting coil on an axis of rotation of the machine, the superconducting pellets being distributed in the orthoradial direction of the superconducting machine and configured to form flux barriers, wherein the electromagnetic coils are made of a superconducting material and wherein the induced element and the inductor are arranged in an assembly forming a cooling chamber provided with at least one vacuum chamber configured to cool down the superconducting induction coil, electromagnetic coils, and superconducting pellets, wherein the electromagnetic coils comprise twisted filaments comprising $MgB_2$ in a titanium matrix, wherein the assembly forming the cooling chamber comprises a first cryogenic chamber in which the superconducting coil is placed and cryogenic chambers in which the rotary portion of the inductor and the induced element are respectively placed.

* * * * *